United States Patent [19]

Willis

[11] 3,992,483

[45] Nov. 16, 1976

[54] PROMOTERS IN THE POLYMERIZATION OF MONOVINYL-AROMATIC COMPOUNDS WITH PRIMARY LITHIUM INITIATORS

[75] Inventor: Daniel H. Willis, Bartlesville, Okla.

[73] Assignee: Phillips Petroleum Company, Bartlesville, Okla.

[22] Filed: Sept. 25, 1975

[21] Appl. No.: 616,534

[52] U.S. Cl. .............................. 260/878 B; 260/879; 260/880 B; 526/347; 526/173
[51] Int. Cl.$^2$ ................ C08F 293/00; C08F 297/04
[58] Field of Search ............ 260/880 B, 878 B, 879

[56] References Cited
UNITED STATES PATENTS

| | | | |
|---|---|---|---|
| 2,802,806 | 8/1957 | Doak ................................ | 260/41.5 |
| 3,030,346 | 4/1962 | Cooper ............................. | 260/83.7 |
| 3,551,522 | 12/1970 | Miles ................................ | 260/878 |
| 3,631,006 | 12/1971 | Hawkins ........................... | 260/80.7 |

OTHER PUBLICATIONS

Org. Chem. of Syn. High Polymers by Lenz, pp. 412–413; Interscience Pub., 1967.

*Primary Examiner*—William F. Hamrock

[57] ABSTRACT

1,1-dialkylethylenes, such as isobutene, promote the primary lithium initiated polymerization of monovinyl-aromatic compounds, such as sytrene, either in homopolymerizations, or in the formation of A—B—A block copolymers or (A—B)$_a$Z radial block copolymers, such as by sequential monomer addition with conjugated dienes.

16 Claims, No Drawings

PROMOTERS IN THE POLYMERIZATION OF MONOVINYL-AROMATIC COMPOUNDS WITH PRIMARY LITHIUM INITIATORS

FIELD OF THE INVENTION

The invention relates to the polymerization of monovinyl-substituted aromatic compounds with primary lithium initiators.

BACKGROUND OF THE INVENTION

As a class, the primary hydrocarbyl lithium initiators characteristically have been insufficiently reactive to be adequately effective in certain polymerization systems, particularly in some of the solution polymerization of monovinyl-substituted aromatic compounds.

Primary hydrocarbyl lithium initiators are generally feasible to employ and one such, n-butyllithium, is relatively cheap. Yet, their relatively low reactivity has mitigated against their use in some applications. Other types of hydrocarbyl lithium compounds, such as secondary, are adequately reactive generally, yet normally cost more, making them less commercially attractive.

The primary hydrocarbyl lithium initiators, such as n-butyllithium, characteristically are relatively sluggish in performance for the polymerization of monovinyl-aromatic compounds. Thus, a given batch of such an initiator tends to act unevenly with time such that the initiation of the monovinyl-substituted aromatic compound polymerization is spread over a relatively broad time interval. The resultant polymer tends to be a product with a substantial variation in vinyl-aromatic block length or, in the case of homopolymerization, a polymer of relatively broad molecular weight distribution. Other types of alkyllithium initiators, such as secondary, for most purposes do not need reactivity boosting, yet their higher cost and less ready availability mitigates against their use.

Hence, there is a need to utilize the readily available and more economical primary alkyl hydrocarbyl initiators because of their attractive pricing structures wherever possible. Needed are methods to increase the reactivity of the primary hydrocarbyl lithium compounds for the polymerization of monovinyl-substituted aromatic compounds in certain applications, e.g., when narrow molecular weight distribution is desired in polymer blocks or homopolymers of monovinyl-aromatic compounds.

SUMMARY OF THE INVENTION

I have discovered that 1,1-dialkylethylenes, such as isobutene, act as effective promoters or activators which assist the polymerization of monovinyl-substituted aromatic compounds with primary hydrocarbyl lithium initiators, such as styrene with n-butyllithium. These promoters are effective in assisting the primary hydrocarbyl lithium initiators, n-alkyl-lithium initiators, in the polymerization of monovinyl-substituted aromatic compounds in the formation of homopolymers of relatively narrow molecular weight distribution, in the formation of block copolymers of A—B—A types with such as with a conjugated diene, e.g., by sequential monomer addition, and in the formation of radial block copolymers (A—B)$_a$Z, wherein A represents the monovinyl-substituted aromatic hydrocarbon derived block, and B represents the conjugated diene derived block. The A—B—A type copolymers prepared according to the invention exhibit unusually high green tensile strength when made in accordance with this invention. In the radial block copolymers (A—B)$_a$Z, Z represents the coupling moiety residue and $a$ the number of branches. Where $a = 2$, a linear block copolymer is represented. Where $a > 2$, a radial block copolymer is represented.

DETAILED DESCRIPTION OF THE INVENTION

According to my invention, I use 1,1-dialkylethylene compounds, for example, isobutene, to activate or promote the primary hydrocarbyl lithium initiators in the polymerization of monovinyl-substituted aromatic compounds. By using such an activator, initiation appears to occur over a relatively short interval of time. Homopolymers of the monovinyl-substituted aromatic monomers are of a more uniform character which is desirable in resinous polymers for many applications. In the formation of A—B—A block copolymers of a rubbery character, wherein A represents a block of monovinyl-substituted aromatic compound homopolymer and B a block of conjugated diene homopolymer, the process of the invention results in products of increased tensile strength. My process also is of importance in formation of the radial block copolymers by sequential monomer addition to form A—B—Li followed by coupling to form (A—B)$_a$Z.

A—B—A block copolymers, well known as thermoplastic elastomers, are particularly desirable where vulcanization is not to be employed. The effect of my invention is especially important in applications, such as radial tire usages, where it is desired during tire fabrication to have a rubber that is better self-reinforced and thus more capable of holding together until vulcanized.

PROMOTERS

The promoters I employ in my invention to improve the reactivity of primary hydrocarbyl lithium initiators are broadly termed 1,1-dialkylethylenes. These promoters can be represented by the general formula:

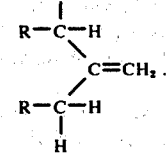

In the above formula, each R is individually selected from hydrogen, methyl, or ethyl, such that the maximum number of carbon atoms per promoter molecule does not exceed 8 for suitable activity in promoting the activity of the primary lithium initiators.

Exemplary promoters include isobutene (2-methylpropene), 2-methyl-1-butene, 2-methyl-1-pentene, 2-ethyl-1-butene, 2-ethyl-1-pentene, 2-propyl-1-pentene, and the like, alone, or in admixture of two or more.

INITIATORS

The process of my invention employs primary hydrocarbyl lithium compounds useful for the initiation under solution polymerization conditions of monovinyl-substituted aromatic monomers. The hydrocarbon radical of these is of the type such that each lithium atom is bound to a carbon atom to which are bound two hydrogen atoms with the fourth bond going either to another hydrogen atom or to another carbon atom of the hydrocarbon radical. Initiators can contain from 1 to 4 lithium atoms per molecule.

The initiators can be represented by the formula: $R^1(CH_2Li)_x$. In the generic formula, the hydrocarbon radical, $R^1$, can be (1) a valence bond; (2) hydrogen; (3) a saturated aliphatic radical; (4) a monoolefinic aliphatic radical; an aromatic substituted (3) or (4) radical; or a saturated cycloaliphatic substituted (3) or (4) radical; which preferably should contain 1 to 18 carbon atoms per molecule for reasonable reactivity, although higher molecular weight compounds can be utilized; and $x$ is 1, 2, 3 or 4.

Examples of the primary hydrocarbyl lithium compounds include such as methyllithium, ethyllithium, n-propyllithium, n-butyllithium, n-dodecyl-lithium, 4-phenylbutyllithium, 4-cyclohexylbutyllithium, 1,2-dilithioethane, 1,4-dilithiobutane, 1,4-dilithio-2-butene, 1,10-dilithiodecane, 1,20-dilithioeicosane, 1,3-dilithio-2-(lithiomethyl)propane, 1,4-dilithio-2,3-di(lithiomethyl)butane, and the like.

As can be seen from the description above, as well as from the examples given, the primary hydrocarbyl lithium initiators are based on a hydrocarbon radical which is basically a primary alkyl radical, but which can contain cycloalkyl, or aryl, such as phenyl, substituents.

MONOMERS

Monovinyl-substituted aromatic compounds applicable to my invention include those known to polymerize with hydrocarbon lithium-based initiators. For availability of feedstocks, monovinyl-substituted aromatic compounds of 8 to 12 carbon atoms presently are preferred, and of these most preferred are the hydrocarbon compounds, though monovinyl-substituted aromatic compounds containing substituents such as fluorine, alkoxy such as methoxy, and the like, on the aromatic ring, which nonhydrocarbon substituents do not deleteriously affect the desired reactions, can be present.

Examples of monovinyl-substituted aromatic compounds include the presently preferred styrene, as well as 1-vinylnaphthalene, 2-vinylnaphthalene, 3-methylstyrene, alpha-methylstyrene, 4-ethylstyrene, 4-n-propylstyrene, 3-fluorostyrene, 4-methoxystyrene, and the like.

Conjugated dienes which can be employed to make the B block of the A—B—A and $(A-B)_aZ$ block copolymers include any of the polymerizable conjugated dienes, preferably the hydrocarbons, known to polymerize with hydrocarbon lithium initiators. Due to availability, those of 4 to 12 carbon atoms per molecule are preferred, presently most preferred for commercial availability 4 to 8 carbon atoms per molecule. Examples of such conjugated dienes include the presently preferred 1,3-butadiene, and also isoprene, as well as such as 2,3-dimethyl-1,3-butadiene, piperylene, 3butyl-1,3-octadiene, 2-phenyl-1,3-butadiene, and the like.

POLYMERIZATION CONDITIONS

Polymerization conditions generally known to the solution polymerization arts can be employed. The polymerization is conducted in the presence of a suitable diluent, preferably hydrocarbon diluents, paraffinic, cycloparaffinic, or aromatic hydrocarbons, and for availability those of about 4 to 10 carbon atoms per molecule are preferred. These hydrocarbon diluents include benzene, toluene, the xylenes, cyclohexane, methylcyclohexane, n-hexane, 2,2,4-trimethylpentane, alone, or in admixture. Presently preferred are the aliphatic and cycloaliphatic hydrocarbons, and of these currently most preferred is cyclohexane or admixtures of cyclohexane with n-hexane. The choice of diluent can be governed to some extent by the choice of polymerization pressure.

Polymerization conditions as to time, temperature, pressure, are those within the skill of the art for polymerizing monomers as described using a hydrocarbon lithium initiation system. The polymerization reaction can be carried out under autogeneous pressure, or at any suitable pressure sufficient to maintain the reaction mixture, including diluent, if any, substantially in the liquid phase. The pressures to be employed will depend to some extent upon the particular diluents employed, and temperatures at which the polymerization is to be carried out. Higher pressures, of course, can be employed where desired, being maintained by any convenient pressurization system or method such as with a gas substantially inert with respect to the polymerization system, such as a light saturated hydrocarbon, or nitrogen, or the like.

Polymerization temperatures employed are those within the skill of the art relative to the type of monomers and initiators described. Polymerization temperatures can range widely, depending on convenience, polymerization time, and other factors within the skill of the art. Presently considered exemplary is a broad temperature range of about 0° to 150° C., and preferred for convenience are temperatures within the range of about 20° to 100° C.

Polymerization times can range broadly such as from a few seconds to many hours, such as upwards of 48 hours, depending on related factors of polymerization temperature, amounts of initiator employed, molecular weight of polymer desired, and the like, as known to those skilled in the art.

According to the method of my invention, a monovinyl-substituted aromatic compound is polymerized with a primary hydrocarbyl lithium initiator employing the 1,1-dialkylethylene promoters. In employment of the promoter, I suggest a broad range of about 50:1 to 7500:1 promoter:primary hydrocarbyl lithium compound, and presently preferred as being satisfactory and convenient a range of about 150:1 to 1000:1, weight ratio.

The amount of primary hydrocarbyl lithium initiator employed in the polymerization in accordance with my invention can range widely. An exemplary initiator level is in the range of about 0.25 to 100, presently preferred about 1 to 50, milliequivalents of lithium per 100 grams of monomer to be polymerized.

As discussed hereinabove, my invention is applicable to the homopolymerization of a monovinyl-substituted aromatic compound monomer in the preparation of various types of resinous polymers.

The invention is particularly applicable to a block copolymerization employing a monovinyl-substituted aromatic compound as an initial monomer, and after polymerization thereof which forms A—Li, the addition thereto and polymerization of a conjugated diene hydrocarbon compound monomer to form onto the first A block a B block of polymerized conjugated diene, thus forming A—B—Li. The monomers are added sequentially, with the addition to the polymerization zone of the monovinyl-substituted aromatic compound coming first, and after substantially complete polymerization thereof, the addition of the desired conjugated diene monomer. This is followed by a third addition of monomer, a monovinyl-substituted aromatic compound, which polymerizes then to form the A—B—A block copolymer.

Similarly, other linear multiblock copolymers of greater number of blocks can also be formed by the sequential addition mode described.

Alternatively, dichain coupling of the polymer lithium A—B—Li, preferably A—½B—Li, present after the second monomer has polymerized can also provide A—B—A block copolymers. In these polymers the structure also can be represented by A—B—Z—B—A wherein Z represents a difunctional coupling agent moiety residue, which because of the relatively small size of the Z, sometimes is omitted and the central B blocks considered as a single B block.

Further, radial or branched multiblock copolymers can correspondingly be made by coupling A—B—Li employing coupling agents possessing three or more sites reactive toward carbon-lithium bonds. For example, where a tetrafunctional coupling agent such as silicon tetrachloride is used, the resulting polymer would be represented by $(A—B)_4Si$.

Presently, where the A—B—A structure is to be prepared by this mode of sequential polymerization of monomers utilizing the promoter I have disclosed, or by sequential addition plus coupling, I suggest broad weight ratio ranges of A:B monovinyl-substituted aromatic compound:conjugated diene of about 5:95 to 50:50. It can thus be seen that my invention is applicable to both resinous homopolymers of monovinyl aromatic monomers, as well as rubbery A—B—A block copolymers.

In polymerization procedures in accordance with the process of my invention in which an A—B—A type block copolymer is prepared, exemplified by polystyrene-polybutadiene-polystyrene as a preferred species and without intending to limit the scope of my invention, broadly I suggest weight ratios for each block of the order of about 5—90—5 to 25—50—25, and presently prefer for most purposes ratios of about 10—80—10 to 20—60—20 phm.

Presently, where the radial $(A—B)_aZ$ structure is to be prepared by sequential polymerization of monomers and coupling of the resulting A—B—Li block copolymers, I suggest weight broad ratios of about 5–50, preferred about 10–50 for A, more preferred about 15–45, the balance B, parts by weight per 100 parts monomer (phm).

Treating agents to react with the A—B—Li living block copolymers to produce linear A—B—A or $(A—B)_aZ$ block copolymers include the polyfunctional agents known to the polymerization arts. These include treating agents containing at least two active groups such as polyepoxides, polyisocyanates, polyamines, polyaldehydes, polyketones, polyanhydrides, polyesters, polyhalides, polyvinylaromatics, and the like, and as well carbon monoxide, carbon dioxide, and others, including monoesters for coupling. Where the treating agent results in coupling, where $a = Z$, a linear block polymer results. Where $a > 2$, preferably 3–7, a radial block copolymer results.

The amount of such treating agent, which is added to the polymerization prior to termination of the active polymer lithium, can be any broad range commonly employed for such purposes. Presently considered exemplary is about 0.1 to 1.5, preferred about 1, equivalent of treating agent per equivalent of lithium. Maximum coupling or branching usually is obtained with about one equivalent. Silicon tetrahalide and divinylbenzene presently are preferred species for preparing branched polymers.

Of course, the usual precautions known for solution polymerization systems employing organolithium-based initiators should be maintained during the course of the polymerization described and disclosed by me. Various materials recognized as detrimental to such catalyst systems should be avoided, such as carbon dioxide, oxygen, moisture, and the like. Usually, it is to be preferred that reactants, catalysts, diluents, activator, and polymerization equipment itself, be substantially free of such materials or any other materials deleterious to the desired polymerization.

After completion of the polymerization, the polymer then can be recovered by suitable means as known to the art. Steam stripping can be applied for removal of diluent. Also, catalyst-inactivating material such as a lower alcohol can be added to the polymerization zone to destroy carbonlithium bonds and at the same time to effect coagulation of the polymer. The coagulum can be separated from alcohol/diluent by any suitable means, decantation, filtration and the like. It is desirable, as is known in the art, for the protection of such polymeric products to add an antioxidant, usually preferably to the polymer solution prior to recovery of the polymer. A typical commonly employed antioxidant is 2,6-di-t-butyl-4-methylphenol.

EXAMPLES

Exemplary runs are provided to assist in an understanding of my invention. Particular components used, operating conditions, and other values, should be considered as illustrative, and not limitative of the reasonable scope of my invention, which scope is based on my overall disclosure.

EXAMPLE I

Four separate polymerizations were carried out in parallel in accordance with the following recipe and procedure. These polymerizations synthesized styrene-butadiene-styrene block copolymers by sequential monomer addition employing various amounts of isobutene as the activator. The polymerizations were carried out under nitrogen in capped beverage bottles employing anhydrous reactants and conditions. The bottles were tumbled in a constant temperature bath for the polymerization times and temperatures indicated. Additions to the capped bottles were made by syringe through rubber-lined perforated bottle caps.

| Recipe and Procedure | | | |
|---|---|---|---|
| Monomer increment | First | Second | Third |
| Styrene | 15 phm[1] | None | 15 phm |
| Butadiene | None | 70 phm | None |
| Cyclohexane | 760 phm | None | None |
| Isobutene | Variable | None | None |
| n-Butyllithium | 2.3 mhm[2] | None | None |
| | a[3] | b[3] | |
| Temperature, °C | 70 | 50 | 70 | 70 |

-continued

Recipe and Procedure

| Time, hours | 1.0 | 1.5 | 0.75 | 0.75 |
| --- | --- | --- | --- | --- |

(1)parts by weight per 100 parts total monomer.
(2)gram millimoles per 100 grams total monomer.
(3)The second monomer increment, the butadiene increment, was allowed to polymerize at 50° C. for 1.5 hours after which time the polymerization temperature was raised to and maintained at 70° C. for an additional 0.75 hour. The temperature reduction of the system from 70° C. prior to introduction of the butadiene was done to facilitate safe introduction of the butadiene. It is not necessary to postpone for such as 1.5 hours restoring the polymerization temperature to 70° C.

From each polymerization, just prior to introduction of the monomer increment, the butadiene, a very small sample of the then existing solution of polystyrene was withdrawn. This first sample was treated by addition of 1 phr 2,6-di-t-butyl-4-methylphenol in a 50/50 volume cyclohexane/isopropyl alcohol solution, and volatiles were removed at reduced pressure. The polystyrene homopolymer A thus obtained was Sample A. The balance of the living polystyrene solution was employed in the continuation of the block polymerization, with successive monomer additions and polymerizations as indicated in the Recipe and Procedure.

Upon completion of polymerization of the third monomer increment, the polymer solution was treated with a standard antioxidant by addition of 1 phr 2,6-di-t-butyl-4-methylphenol in a 50/50 volume cyclohexane/isopropyl alcohol solution. A small sample was withdrawn at this point and volatiles were removed at reduced pressure. The A—B—A block copolymer was thus isolated as Sample B. Sample B was taken to permit determination of molecular weight and inherent viscosity on polymer in which the possibility of loss of low molecular weight fractions through solubilization during coagulation was circumvented by the alternative of isolating the sample through evaporation.

The remainder of the stabilized polymer solution was diluted with isopropyl alcohol to coagulate the polymer, and the coagulum was collected by filtration and dried at reduced pressure. The A—B—A block copolymer thus isolated was Sample C.

All three samples so obtained were examined and the results of examination are shown in Table I.

TABLE I

| | | Samples A | | | | |
| --- | --- | --- | --- | --- | --- | --- |
| Run No. | Activator Isobutene phm | $M_w^{(f)}$ × $10^{-3}$ | $M_n^{(f)}$ × $10^{-3}$ | $HI^{(a)}$ | $IV^{(b)}$ | Gel,$^{(e)}$ wt. % |
| 1 | 0 | 42 | 24 | 1.79 | 0.31 | 0 |
| 2 | 26.5 | 24 | 16 | 1.53 | 0.23 | 0 |
| 3 | 70.5 | 19 | 13 | 1.41 | 0.20 | 0 |
| 4 | 144.2 | 15 | 10 | 1.45 | 0.15 | 0 |
| | | Samples B | | | | |
| 1 | 0 | 67 | 56 | 1.21 | 0.78 | 0 |
| 2 | 26.5 | 64 | 54 | 1.19 | 0.77 | 0 |
| 3 | 70.5 | 64 | 51 | 1.25 | 0.73 | 0 |
| 4 | 144.2 | 75 | 67 | 1.12 | 0.81 | 0 |
| | | Samples C | | | | |
| | | $ML-4^{(c)}$ at 212° F | $Tensile^{(g)}$ psig | $Elongation^{(g)}$ % | | |
| 1 | 0 | 55 | 200 | 760 | | |
| 2 | 26.5 | 68 | 325 | 760 | | |
| 3 | 70.5 | 87 | 460 | 770 | | |
| 4 | 144.2 | —$^{(d)}$ | 780 | 940 | | |

$^{(a)}$Heterogeneity index - the quotient of the weight average molecular weight divided by the number average molecular weight.
$^{(b)}$Inherent viscosity - determined in tetrahydrofuran essentially according to the process shown in U.S. Pat. No. 3,278,508, column 20, note a.
$^{(c)}$Mooney viscosity - ML-4 at 212° F. determined in accordance with ASTM D1646-63.
$^{(d)}$Too high to measure.
$^{(e)}$Determined in accordance with U.S. Pat. No. 3,278,508, column 20, note b.
$^{(f)}$$M_w$ and $M_n$ - weight average molecular weight and number average molecular weight determined by gel permeation chromatography in accordance with Kraus, G., and Stacy, C. J., J. Poly. Sci. Symposium No. 43, 329-343 (1973).
$^{(g)}$Tensile and % Elongation values determined in accordance with ASTM D412-66.

The data for Samples A reflect the operation of the activator, isobutene, in a readily apparent increased degree of utilization of the primary hydrocarbyl lithium initiator as shown by the resultant increase in the number of polymer chains initiated shown by the consequent progressive reduction in $M_w$ and $M_n$ molecular weight with increasing amounts of isobutene employed.

The tensile data for Samples B and C also reflect the effectiveness of the 1,1-dialkylethylene activator present during polymerization of the styrene first monomer. The activator, of course, also was present during polymerization of the butadiene second monomer, but appears of no apparent influence.

While polymer Samples B and C were isolated in slightly differing fashion, yet the molecular weights will be closely similar between the two groups. Thus, the tensile values for the polymers showing increasing values with increased use of the promoter of the invention, while molecular weights remained relatively constant.

UTILITY

The polymers made in accordance with this invention can be compounded with stabilizers, antioxidants, fillers, pigments, reinforcing agents and such other additives as may be required. These products can be employed in the fabrication of molded and extruded articles, housewares, hoses and tubing, sheeting, shoe soles, gaskets and the like can be employed in compounding adhesives.

The disclosure, including data, illustrate the value and effectiveness of my invention. The examples, the knowledge and background of the field of the invention and general principles of chemistry and other applicable sciences, have formed the bases from which the broad descriptions of the invention including the ranges of conditions and generic groups of operant components have been developed, which have formed the bases for my claims here appended.

What is claimed is:

1. The process which comprises polymerizing at least one first monovinyl-substituted aromatic compound monomer with a primary hydrocarbyl lithium polymerization initiator and a 1,1-dialkyl-ethylene promoter under solution polymerization conditions of temperature and pressure, wherein said process employs an amount of said promoter effective to promote said polymerization of said monovinyl-substituted aromatic monomer with said primary hydrocarbyl lithium initiator, and said 1,1-dialkylethylene promoter contains up to 8 carbon atoms per molecule,
    adding a polymerizable conjugated diene monomer to said polymerization prior to termination and after substantially complete conversion of said first monomer, and polymerizing said conjugated diene monomer to substantially complete conversion, and thereafter prior to termination adding a second monovinyl-substituted aromatic compound monomer to said polymerization and polymerizing said second monovinyl aromatic compound monomer thereby preparing an A—B—A block copolymer, wherein each A represents a block of polymerized monovinyl-substituted aromatic compound, and said B represents said block of polymerized conjugated diene, and wherein a weight ratio A—B—A of about 5—90—5:25—50—25 is represented.

2. The process according to claim 1 wherein said monovinyl-substituted aromatic hydrocarbon contains 8 to 12 carbon atoms per molecule.

3. The process according to claim 2 wherein said monovinyl-substituted aromatic compound is styrene, 1-vinylnaphthalene, 2-vinyl-naphthalene, 3-methylstyrene, alpha-methylstyrene, 4-ethylstyrene, 4-n-propylstyrene, 3-fluorostyrene, or 4-methoxystyrene.

4. The process according to claim 1 wherein said conjugated diene monomer is 1,3-butadiene, isoprene, 2,3-dimethyl-1,3-butadiene, piperylene, 3-butyl-1,3-octadiene, or 2-phenyl-1,3-butadiene.

5. The process according to claim 4 wherein said 1,1-dialkylethylene promoter is represented by the formula:

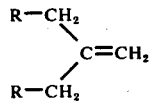

wherein each R is selected from hydrogen, methyl, or ethyl.

6. The process according to claim 5 wherein said 1,1-dialkylethylene is isobutene, 2-methyl-1-butene, 2-methyl-1-pentene, 2-ethyl-1-butene, 2-ethyl-1-pentene, 2-propyl-1-pentene, or mixture.

7. The process according to claim 5 wherein said effective amount of said 1,1-dialkylethylene is in the range of about 50:1 to 7500:1 weight ratio relative to said primary hydrocarbyl lithium compound.

8. The process according to claim 1 wherein said primary hydrocarbyl lithium compound is represented by R'(CH$_2$Li)$_x$ wherein R' is a valence bond, hydrogen, saturated aliphatic radical, monoolefinic aliphatic radical, which radicals can be aromatic or saturated cycloaliphatic substituted, x is an integer of 1 to 4, and R' contains 1 to 18 carbon atoms.

9. The process according to claim 8 wherein said primary hydrocarbyl lithium compound is methyllithium, ethyllithium, n-propyllithium, n-butyllithium, n-dodecyllithium, 4-phenylbutyllithium, 4-cyclohexylbutyllithium, 1,2-dilithioethane, 1,4-dilithiobutane, 1,4-dilithio-2-butene, 1,10-dilithiodecane, 1,20-dilithioeicosane, 1,3-dilithio-2-(lithiomethyl)propane, or 1,4-dilithio-2,3-di(lithiomethyl)butane.

10. The process according to claim 1 wherein said A—B—A block copolymer represents a weight ratio of about 10:80:10 to 20:60:20.

11. The process according to claim 1 wherein is employed a ratio of said 1,1-dialkylethylene promoter:said primary hydrocarbon/lithium initiator of about 150:1 to 1000:1.

12. The process according to claim 11 wherein said polymerization conditions include a polymerization temperature in the range of about 0° to 150° C., and under a pressure sufficient to maintain polymerization components substantially in the liquid phase, and polymerization in a polymerization diluent.

13. The process according to claim 1 wherein said activator is isobutylene and said initiator is n-butyllithium.

14. The process according to claim 13 employing styrene as said first monovinyl-substituted aromatic monomer, butadiene as said conjugated diene, and styrene as said second monovinyl-substituted aromatic monomer, such that the resulting A—B—A product is a polystyrene-polybutadienepolystyrene block copolymer.

15. A process for the preparation of an A—B—A thermoplastic block copolymer which comprises the steps of polymerizing under solution polymerization conditions a first monomer charge selected from monovinyl-substituted hydrocarbons of 8 to 12 carbon atoms per molecule employing a primary hydrocarbyl lithium initiator a 1,1-dialkylethylene promoter of the formula

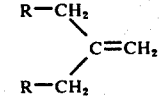

wherein each R is hydrogen, methyl, or ethyl, effective to promote the polymerization of said first monomer with said primary hydrocarbyl lithium initiator, employing a ratio of said promoter:primary hydrocarbyl lithium initiator in the range of about 50:1 to 7500:1, thereby preparing a living A—Li block polymer, thereafter, after substantially complete polymerization of said first monovinyl-substituted aromatic hydrocarbon adding to the living A—Li block polymer so prepared a second monomer charge selected from conjugated dienes of 4 to 12 carbon atoms per molecule, and polymerizing said so added conjugated diene monomer to such thereby forming a living A—B—Li block copolymer, adding to the so-prepared A—B—Li block copolymer a third monomer charge selected from monovinyl-substituted aromatic hydrocarbons of 8 to 12 carbon atoms per molecule, and continuing polymerization thereby preparing an A—B—A—Li block copolymer, terminating said polymerization process, thereby preparing an A—B—A block copolymer, and wherein the weight ratio of the A—B—A blocks in the ratio of about 5—90—5 to 25—50—25.

16. The process of claim 15 wherein said monovinyl-substituted aromatic monomer is styrene; said conjugated diene is butadiene; said 1,1-dialkylethylene is isobutene, and said primary hydrocarbyl lithium initiator is n-butyllithium.

* * * * *

UNITED STATES PATENT AND TRADEMARK OFFICE
CERTIFICATE OF CORRECTION

PATENT NO. : 3,992,483
DATED : November 16, 1976
INVENTOR(S) : Daniel H. Willis

It is certified that error appears in the above-identified patent and that said Letters Patent are hereby corrected as shown below:

Column 9, claim 5, line 25, delete "claim 4" and substitute therefore

--- claim 1 --- ;

Column 10, claim 14, line 17, delete "polystyrene-polybutadienepolystyrene" and substitute therefore --- polystyrene-polybutadiene-polystyrene---.

Signed and Sealed this

Thirty-first Day of May 1977

[SEAL]

Attest:

RUTH C. MASON
Attesting Officer

C. MARSHALL DANN
Commissioner of Patents and Trademarks